(12) United States Patent
Gobert et al.

(10) Patent No.: US 8,953,653 B2
(45) Date of Patent: Feb. 10, 2015

(54) STABILIZED FEMTOSECOND PULSED LASER AND STABILIZATION METHOD

(75) Inventors: Olivier Gobert, Gallardon (FR); Michel Comte, Antony (FR); Pierre-Mary Paul, Draveil (FR); Jean-Francois Hergott, L'Hay-les-Roses (FR)

(73) Assignees: Amplitude Technologies, Lisses (FR); Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/995,824

(22) PCT Filed: Dec. 21, 2011

(86) PCT No.: PCT/FR2011/053137
§ 371 (c)(1),
(2), (4) Date: Jun. 19, 2013

(87) PCT Pub. No.: WO2012/085467
PCT Pub. Date: Jun. 28, 2012

(65) Prior Publication Data
US 2013/0272328 A1    Oct. 17, 2013

(30) Foreign Application Priority Data
Dec. 22, 2010  (FR) ...................................... 10 05177

(51) Int. Cl.
*H01S 3/13*    (2006.01)
*H01S 3/00*    (2006.01)
(Continued)

(52) U.S. Cl.
CPC ............. *H01S 3/1307* (2013.01); *H01S 3/0057* (2013.01); *H01S 3/2308* (2013.01); *G02F 1/0327* (2013.01); *H01S 3/2325* (2013.01)
USPC ............................................. 372/30; 372/25

(58) Field of Classification Search
CPC ....... H01S 3/302; H01S 3/06783; H01S 3/10; H01S 3/10053; H01S 3/1127; H01S 3/1301; H01S 3/1305; H01S 5/065; H01S 5/509; H01S 3/0057; H01S 3/005; H01S 3/2383; H01S 5/06835
USPC ...................................................... 372/25, 30
See application file for complete search history.

(56) References Cited

U.S. PATENT DOCUMENTS

2004/0017833 A1*  1/2004  Cundiff et al. .................. 372/18
2005/0226278 A1* 10/2005  Gu et al. ........................... 372/6
(Continued)

OTHER PUBLICATIONS

He Wang et al.: "Power locking of high-repetition-rate chirped pulse amplifiers", Applied Physics B., Lasers and Optics, Springer, Berlin, DE, vol. 89, No. 2-3, Sep. 7, 2007, pp. 275-279, XP019562056, ISSN: 1432-0649, DOI: 10.1007/S00340-007-2774-8 p. 276; figure 1 p. 277, left-hand column—p. 278, right-hand column; figure 4, Cited in ISR.

(Continued)

*Primary Examiner* — Xinning Niu
*Assistant Examiner* — Vu A Vu
(74) *Attorney, Agent, or Firm* — Young & Thompson

(57) ABSTRACT

The present invention relates to a high-power femtosecond pulsed laser, the laser including: a source able to generate a train of input laser pulses having an envelope frequency and a carrier frequency; a chirped pulse amplification unit; and, a unit for controlling the phase drift between the envelope frequency and the carrier frequency of the output laser pulses. According to the invention, the unit for controlling the phase drift between the envelope frequency and the carrier frequency includes electro-optical phase-modulation unit that are placed on an optical path of the chirped pulse amplification unit in order to stabilize the phase drift between the envelope frequency and the carrier frequency of the output laser pulses as a function of time.

16 Claims, 5 Drawing Sheets

(51) Int. Cl.
*H01S 3/23* (2006.01)
*G02F 1/03* (2006.01)

(56) References Cited

U.S. PATENT DOCUMENTS

2007/0014319 A1* 1/2007 Hill et al. .................. 372/20
2010/0061411 A1* 3/2010 Chang et al. ............... 372/25

OTHER PUBLICATIONS

Gobert O et al.: "Carrier-envelope phase control using linear electro-optic effect", Optics Express Optical Society of America USA, vol. 19, No. 6, Mar. 8, 2011, pp. 5410-5418, XP002657577, ISSN: 1094-4087 the whole document, Cited in ISR.

Nakajima Y et al.: "A low-noise, octave-spanning optical frequency comb generated by a mode-locked fiber laser with an intracavity electro-optic modulator", Lasers and Electro-Optics, 2009 and 2009 Conference on Quantum Electronics and Laser Science Conference. CLEO/QELS 2009. Conference on, IEEE, Piscataway, NJ, USA, Jun. 2, 2009, pp. 1-2, XP031521910, ISBN: 978-1-55752-869-8, the whole document, Cited in ISR.

Adachi S et al.: "Carrier-Envelope Phase Control of Few-Cycle Parametric Chirped-Pulse Amplifier", Japanese Journal of Applied Physics Japan Soceity of Applied Physics Japan, vol. 49, No. 3, Mar. 2010, XP002657702, ISSN: 0021-4922 figure 6, Cited in ISR.

Zhihao Yu et al.: "Spatial distribution of carrier-envelope phase for femtosecond pulsed laser beam profile determined by asymmetric spectral interferometry", Optics Letters Optical Society of America USA, vol. 35, No. 13, Jul. 1, 2010, pp. 2275-2277, XP002657669, ISSN: 0146-9592 p. 2277, Cited in ISR.

Grebing C et al.: "Isochronic and isodispersive carrier-envelope phase-shift compensators", Applied Physics B: Lasers and Optics Springer Berlin Germany, vol. 97, No. 3, Nov. 2009, pp. 575-581, XP002657703, ISSN: 0946-2171 cited in the application figure 1, Cited in ISR.

International Search Report, dated May 18, 2012, from corresponding PCT application.

* cited by examiner

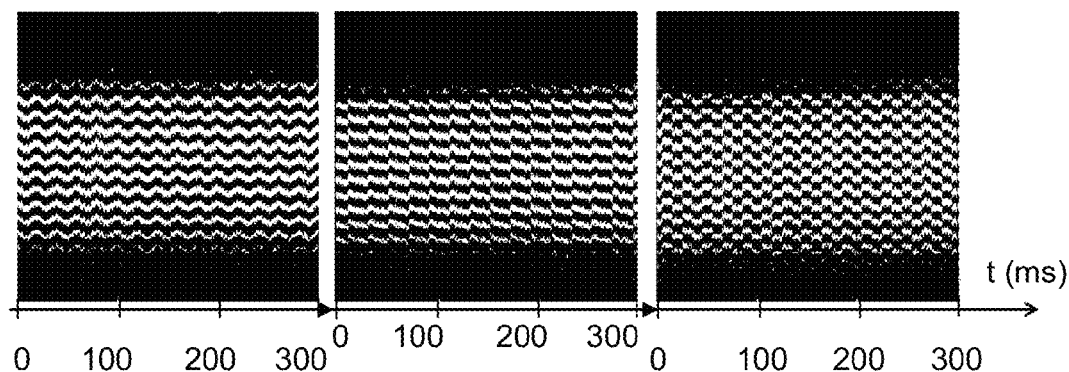
Fig. 7A  Fig. 7B  Fig. 7C
Figure 8
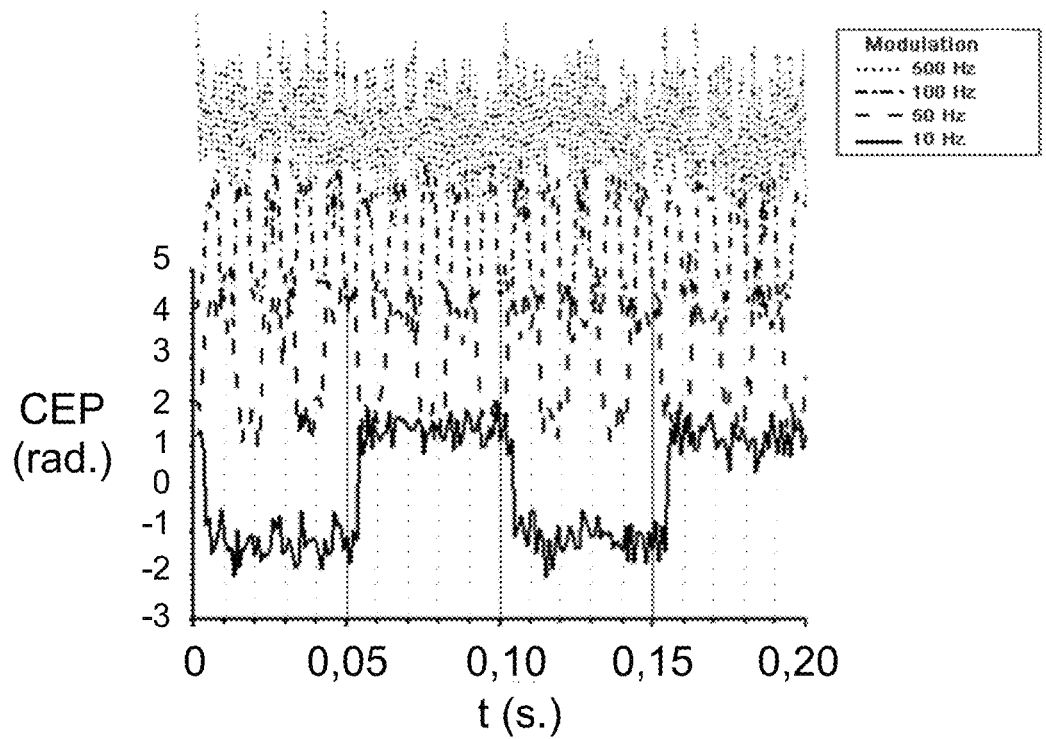

STABILIZED FEMTOSECOND PULSED LASER AND STABILIZATION METHOD

BACKGROUND OF THE INVENTION

The field of invention relates to the ultrashort-pulse lasers (femtosecond regime). More precisely, the invention relates to a femtosecond (fs) pulsed laser, characterized by a carrier frequency and by an envelope frequency. Still more precisely, the invention relates to a mean for stabilizing the phase drift between the carrier frequency and the envelope frequency of a train of femtosecond laser pulses.

DESCRIPTION OF THE RELATED ART

Since around twenty years, the research and development of short-pulse lasers have known a significant progress. The pulse durations obtained belong at the present time to the femtosecond domain. In parallel, the development of the technique of chirped pulse amplification (D. Strickland, G. Mourou "Compression of amplified chirped optical pulses" Optics communications, vol. 55, issue 6, 15 Oct. 1985, p. 447-449 & Optics communications, vol. 56, issue 3, 1 Dec. 1985, p 219-221) has allowed reaching very high peak powers, of the order of the petaWatt.

One of the research axes about this type of sources relates to the so-called phenomenon of phase drift between envelope and carrier, schematically illustrated in FIG. 1. A light wave coming from a laser is an electromagnetic wave whose electric field may be represented by the product of a wave at a given frequency, the carrier wave (50), by an envelope function (60). The frequency of the carrier wave (50) is directly linked to the wavelength of the laser, whereas the envelope (60) allows characterizing the duration of the pulses and the pulse repetition frequency ($f_{rep}$). The speed of propagation of the envelope (60) is called the group velocity and corresponds to the speed of propagation of the energy. That of the carrier frequency (50) is called the phase velocity. In a dispersive medium, the group and phase velocities are generally different from each other, which may induce a time drift of the carrier oscillation inside the envelope (cf. FIG. 1).

For relatively "long" pulse durations, i.e. for example of the order of the nanosecond, each pulse contains a very high number of optical cycles (of the order of $3.10^5$ cycles in the visible spectrum), and the drift between the frequency of the carrier and the frequency of the envelope has no notable consequence. In the case of the ultrashort-laser pulses, the number of optical cycles is on the contrary not much high (cf. FIG. 1) and the time position of the carrier in the envelope may have significant consequences on certain physical phenomena which are sensitive to the electric field and not to the field envelope (A. Baltuska et al. "Attosecond control of electronic processes by intense light fields" Nature 421-2003).

If the maximum of the electric field coincides with the position of the maximum of the envelope for a given pulse, this may be no longer the case at the following pulse. This time shift corresponds to a phase shift $\Delta\phi$ of the carrier and it is also designated by the acronym CEP (Carrier Envelope Phase). The phase shift $\Delta\phi$ may vary in time according to the occurrence of perturbations of various origins on the optical path of the laser (vibrations, variations of refractive index of the materials . . . ). The variations of the phase shift $\Delta\phi$, i.e. the CEP variations, as a function of time are called "phase drift between envelope frequency and carrier frequency". This is illustrated for example in the publication of Nisoli et al., which describes the measurement of the random variations of CEP, shot by shot, for pulses of duration comprised between 5 and 7 fs ("Effects of Carrier-Envelope Phase Differences of Few-Optical-Cycle Light Pulses in Single-Shot High-Order-Harmonic Spectra" Phys. Rev. Letters, Vol. 91, n° 21, 2003). Another example is described in the publication of Z. Chang ("Carrier-envelope phase shift caused by grating-based stretchers and compressors" Applied Optics, vol. 45, n° 32, 2006) in which the influence of a diffraction-grating-based stretcher or compressor on the CEP drift is evaluated.

The technique problem that is considered herein generally relates to the stabilization and the control of the phase drift between envelope frequency and carrier frequency of ultrashort laser pulses.

Apart from the particular case of the optical parametric oscillators which, in certain specific conditions (A. Baltuska et al. "Controlling the Carrier-Envelope Phase of Ultrashort Light Pulses with Optical Parametric Amplifiers" Physical Review Letters, Vol. 88, n° 13, 1 Apr. 2002), allow freeing elegantly from the CEP drifts, various techniques of correction of the CEP exist, which are based on a slow feedback loop containing a f-2f interferometer (Kakehata et al. "Measurements of carrier-envelope phase changes of 100-Hz amplified laser pulses" Applied Physics B. 74, S43-S50 2002). They can be grouped into two categories.

The first one relates to the mode-locked oscillators and the correction is made by acting on certain parameters of the cavity (Jones et al. "Carrier Envelope Phase Control of Femtosecond Mode-Locked Lasers and Direct Optical Frequency Synthesis" Science 288,635,2000). Let's note that this method does not allow, with a single control loop, to correct the possible fluctuations of CEP downstream of the cavity, linked for example to perturbations on the subsequent path of the laser beam.

The second category, which supposes a previous stabilization of the oscillator, corresponds to corrections made downstream of the latter, generally before the amplification. Among the main techniques used, it may be mentioned:

the use of a pair of prismatic plates in a dispersive material. The mechanical displacement of the plates allows modifying the CEP (C. Grebing et al., "Isochronic and iso-dispersive carrier-envelope phase-shift compensators", Applied Physics B 97, p. 575-581, 2009). However, the necessity of a mechanical movement allows only a correction of the relatively slow phase drift;

the modification of a parameter of the compressor or of the stretcher, wherein this parameter can be the distance between two gratings or between two prisms (Chang, "Carrier-envelope phase shift caused by grating-based stretchers and compressors" Applied Optics, vol. 45, n° 32, 2006, p. 8350-8353). Here again, the necessity of a mechanical movement of interferometric precision limits the speed of the device.

the use of an acousto-optic programmable dispersive filter (OAPDF) (P. Tournois "Acousto-optic programmable dispersive filter for adaptive compensation of group delay time dispersion in laser systems" Optics communications 140 245-249 (1997)). Such an acousto-optic dispersive filter allows inducing a programmable phase shift with a fast response time (kHz) but the cost of such a device is high;

the use of a 4f system with a liquid crystal matrix (Spatial Light Modulator) (M. Kakehata et al. "Use of a 4f pulse shaper as an active carrier-envelope phase shifter" Conference paper, CLEO 2004, CTuP, CTuP31). The response time is important and does not allow correcting the CEP drift, shot by shot.

SUMMARY OF THE INVENTION

One of the objects of the invention is to provide a device and a method of stabilization of the CEP that is applicable to the high-energy chirped pulse amplification lasers operating at high repetition frequencies (of the order of the kHz to the MHz) and of reduced cost.

In the present document, it is meant by "high-energy laser pulses" laser pulses having an energy higher than the nanojoule.

More precisely, the invention relates to a high-energy femtosecond pulsed laser, stabilized as regards the phase drift between envelope frequency and carrier frequency, said laser comprising a source of laser pulses to be amplified, said source being adapted to generate a train of input laser pulses having an envelope frequency and a carrier frequency, chirped pulse amplification means comprising stretching means adapted to time stretch the input laser pulses, optical amplification means adapted to amplify the stretched laser pulses and compression means adapted to time compress the amplified laser pulses, and means for controlling the phase drift between envelope frequency and carrier frequency of the output laser pulses. According to the invention, said means for controlling the phase drift between envelope frequency and carrier frequency comprise electro-optical modulation means placed on an optical path of the laser pulses so as to stabilize the phase drift between envelope frequency and carrier frequency of the output laser pulses as a function of time.

According to a first embodiment of the invention, said electro-optical modulation means comprise a transverse-Pockels-effect electro-optical phase modulator.

According to different particular aspects of the first embodiment of the invention:
- the laser further comprises means for angularly orienting the ordinary and/or extraordinary optical axes of said Pockels-effect modulator relative to a direction of polarization of the laser pulses;
- said Pockels-effect modulator is placed on the optical path of the chirped pulse amplification means.

According to a second embodiment of the invention, said stretching means and/or said compression means comprise at least one prism and said electro-optical modulation means comprise electrodes respectively deposited on faces of said prism and means for applying an electric field to the terminals of said electrodes so as to induce a modulation of the refraction index of said prism.

According to a particular aspect of the second embodiment of the invention, said stretching means and/or said compression means respectively comprise two prisms arranged so as to compensate for a spatial offset of the optical beam and said electro-optical modulation means comprise electrodes respectively deposited on faces of said two prisms and means for applying an electric field to the terminals of the electrodes of the two prisms so as to modulate the refraction index of the two prisms.

According to various particular aspects of the invention,
- said electro-optical modulation means have an operating frequency comprised between a few Hz and several MHz;
- the laser further comprises means for measuring the phasedrift between envelope frequency and carrier frequency of the output laser pulses as a function of time; and/or
- the laser further comprises a feedback loop so as to adjust the modulation induced by said electro-optical means as a function of the measurement of the phase drift between envelope frequency and carrier frequency.

The invention also relates to a method of stabilization of the phase drift between envelope frequency and carrier frequency of a high-energy (higher to the nanojoule) femtosecond pulsed laser, said method comprising the following steps:
- generation of a train of input laser pulses formed of an envelope frequency and a carrier frequency;
- chirped pulse amplification of said input laser pulses comprising a step of time stretching of said input laser pulses, a step of optical amplification of said stretched laser pulses and a step of time compression of said stretched and amplified laser pulses, and
- said step of chirped pulse amplification comprising a step of stabilization of the phase drift between envelope frequency and carrier frequency of the output laser pluses.

According to the method of the invention, said step of stabilization of the phase drift between envelope frequency and carrier frequency comprises an electro-optical modulation of an optical component so as to stabilize the phase drift between envelope frequency and carrier frequency of the output laser pulses as a function of time.

According to a particular aspect of the method of the invention, said method further comprises:
- a step of measurement of the phase drift between envelope frequency and carrier frequency of the output laser pulses as a function of time, and
- a step of adjustment of the feedback electro-optical phase modulation as a function of said measurement of the phase drift between envelope frequency and carrier frequency.

The present invention also relates to the features that will become evident from the following description and that will have to be considered either alone or in any technically possible combination thereof.

BRIEF DESCRIPTION OF THE DRAWING FIGURES

This description, which is given by way of non-limitative example, will allow a better understanding of how the invention can be implemented, with reference to the appended drawings in which:

FIG. 1 schematically shows an electromagnetic wave defined by a carrier frequency and an envelope frequency;

FIG. 2 schematically shows the first configuration used (spectral interferometry) for revealing the CEP correction according to a first embodiment of the invention;

Figure 5:
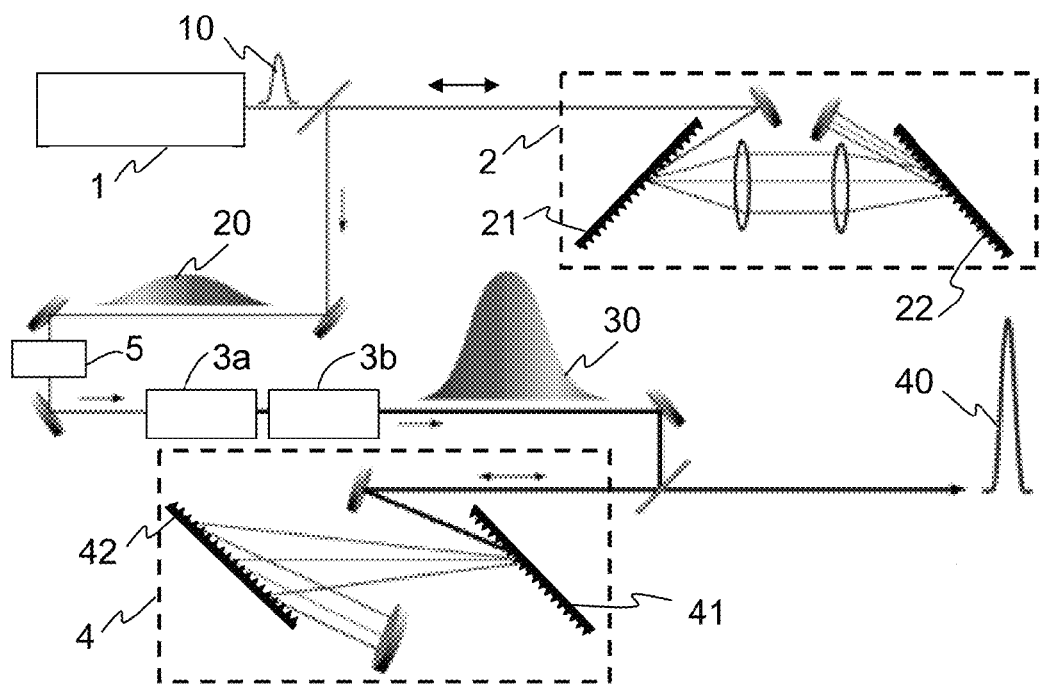
Figure 6:
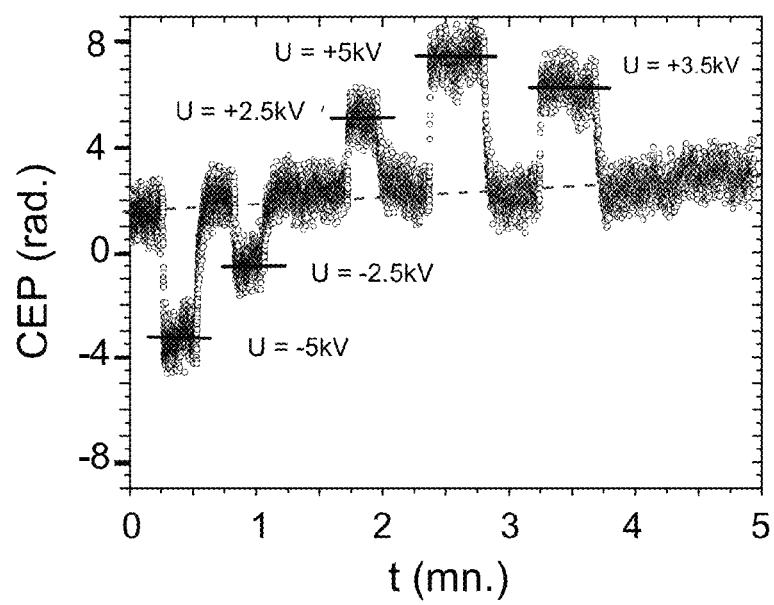
Figure 9:
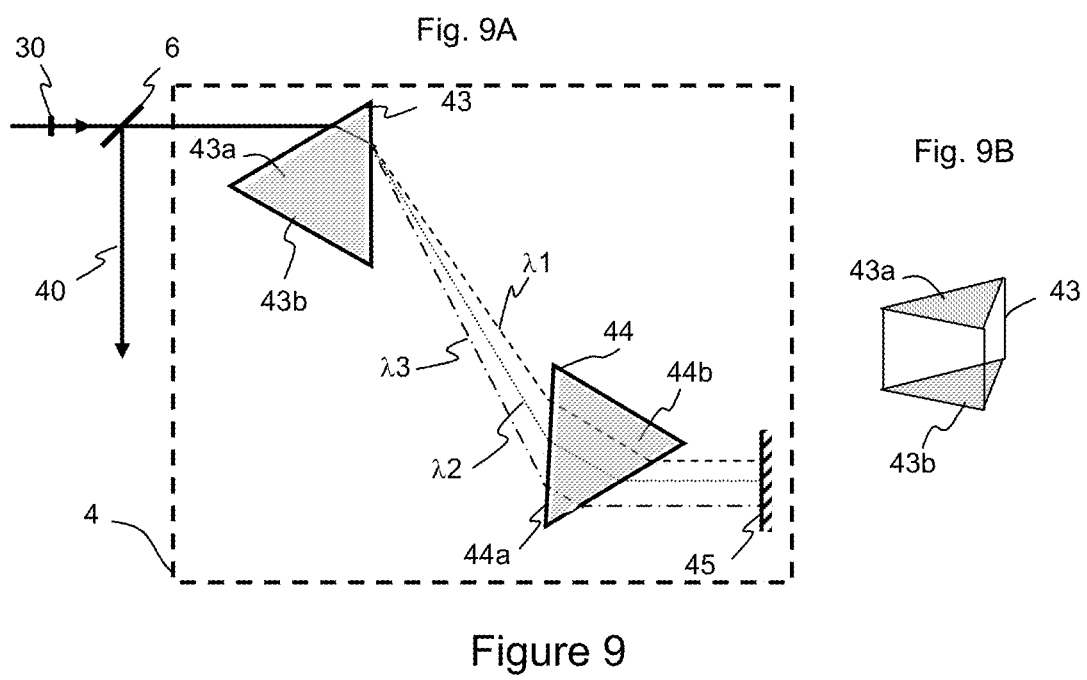

FIG. 5 schematically shows a chirped pulse amplification laser device used for revealing the CEP correction according to a first embodiment of the invention;

FIG. 6 shows shot-by-shot measurements of the CEP response of an electro-optical modulator used in an embodiment of the invention;

FIG. 7 shows measurements of interference fringes by f-2f interferometry for various forms of voltage modulations applied to an electro-optical modulator, a sinusoidal voltage (FIG. 7A), a saw-toothed voltage (FIG. 7B), a rectangular-shaped voltage (FIG. 7C), respectively;

FIG. 8 shows various curves of CEP measurement as a function of various modulation frequencies;

FIG. 9A schematically shows a CEP modulation device according to a second embodiment of the invention and FIG. 9B schematically shows a perspective view of a prism used in the second embodiment.

DETAILED DESCRIPTION OF THE INVENTION

First Embodiment

The first embodiment is based on the modulation of the CEP of optical pulses by means of using only one optoelectronic component. More precisely, the first embodiment is based on the use of a modulator of the electro-optical type, the principle of which will be detailed hereinafter. Let's consider a laser pulse propagating in a dispersive optical element. The phase time $T_\varphi$ and the group delay time $T_g$ are defined by the following equations (1.a) and (1.b), respectively:

$$T_\varphi = \frac{n(\omega_0) \cdot L}{c} \quad (1.a)$$

$$T_g = \frac{n_g(\omega_0) \cdot L}{c} \quad (1.b)$$

where c represents the velocity of light in vacuum, L the length traveled by the optical beam in the dispersive element, $\omega_0$ is the central (angular) frequency of the laser, $n(\omega_0)$ and $n_g(\omega_0)$ being the refraction index and the group index, respectively, on the medium at the frequency $\omega_0$.

The delay induced by the difference between the group velocity and the phase velocity may thus be written according to the equation (2):

$$T_g - T_\varphi = [n_g(\omega_0) - n(\omega_0)]\frac{L}{c} \quad (2)$$

The group index $n_g$ is linked to the module of the wave vector k $$\left[k = \frac{n\omega}{c}\right]$$

by the relation (3a):

$$\frac{n_g(\omega_0)}{c} = \left.\frac{\partial k}{\partial \omega}\right|_{\omega_0} \quad (3a)$$

which allows expressing the group index as a function of the refraction index and of the wavelength $\lambda_0$:

$$n_g(\omega_0) = n(\lambda_0) - \lambda_0 \left.\frac{\partial n}{\partial \lambda}\right|_{\lambda_0} \quad (3b)$$

The equation (2) may thus be expressed as the equation (4):

$$T_g - T_\varphi = -\lambda_0 \cdot \left.\frac{\partial n}{\partial \lambda}\right|_{\lambda_0} \cdot \frac{L}{c} \quad (4)$$

An electric field E applied to a medium generates a transverse-Pockels-effect variation of the refraction index. Herein is considered an optical pulse propagating for example in a lithium niobate (LiNbO$_3$) crystal in the direction Oz. However, the same principle is applicable to other non-linear crystals presenting the Pockels effect, as the RTP, the KTA, etc. . . . The laser field is supposed to be linearly polarized in the direction Ox, just as the electric field applied, and the axis Ox corresponds to the extraordinary axis. The electric field applied is thus transverse to the propagation axis of the pulse beam. The ordinary $n_o$ and extraordinary $n_e$ indices are then given as a function of the electric field E and of the electro-optical tensor elements $r_{13}$ and $r_{33}$ by the following relations:

$$n_0(E) = n_0 - \frac{1}{2} \cdot n_0^3 \cdot r_{13} \cdot E \quad (5.1)$$

$$n_e(E) = n_e - \frac{1}{2} \cdot n_e^3 \cdot r_{33} \cdot E \quad (5.2)$$

The use of the relation (5.2) thus gives the variation of the delay (induced by the deviation between group and phase velocities) when the electric field is applied:

$$(T_g - T_\varphi)[E] - (T_g - T_\varphi)[E = 0] = \quad (6)$$

$$\lambda_0 \left[\frac{3}{2}n_e^2(\lambda_0) \cdot r_{33}(\lambda_0) \cdot \left.\frac{\partial n_e}{\partial \lambda}\right|_{\lambda_0} + \frac{n_e^3(\lambda_0)}{2}\left.\frac{\partial r_{33}}{\partial \lambda}\right|_{\lambda_0}\right]\frac{E \cdot L}{c}$$

This finally allows writing the CEP variation in the following form:

$$\Delta\varphi_{CEP} = \omega_0 \cdot \lambda_0 \left[\frac{3}{2} \cdot n_e^2(\lambda_0) \cdot r_{33}(\lambda_0) \cdot \left.\frac{\partial n_e}{\partial \lambda}\right|_{\lambda_0} + \frac{n_e^3(\lambda_0)}{2}\left.\frac{\partial r_{33}}{\partial \lambda}\right|_{\lambda_0}\right] \cdot \frac{E \cdot L}{c} \quad (7)$$

The phase drift between envelope frequency and carrier frequency $\Delta\phi_{CEP}$ is thus a linear function of the electric field E applied to the terminals of the electro-optical modulator.

By applying an adequate voltage to such a modulator, it is therefore possible to correct the CEP variation of an ultrashort pulse laser. If this device is associated with a feedback loop, it is possible to control the CEP.

Experimental CEP Control Device

Two different experimental devices have been used to test the performances of a transverse-Pockels electro-optical modulator consisted, for example, of a lithium niobate (LiNbO$_3$) crystal. A goldplating is performed on the faces of the crystal in the direction Oy, according to which the voltage may be applied. The laser radiation is polarized linearly according to the direction Ox.

First Device

Figure 1:
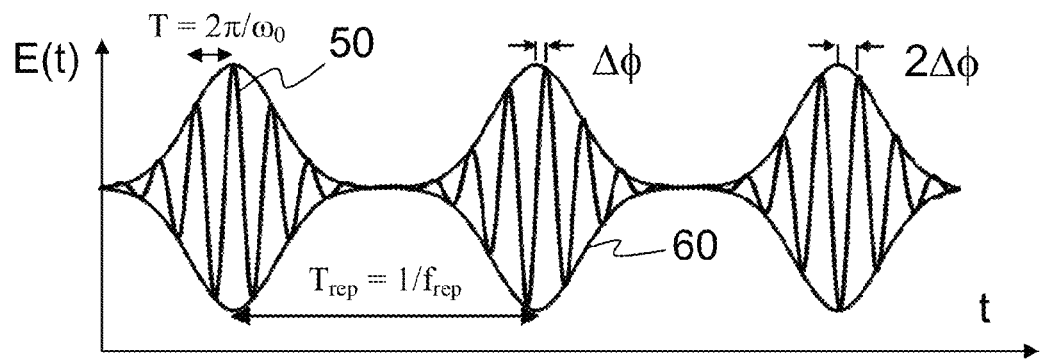
Figure 2:
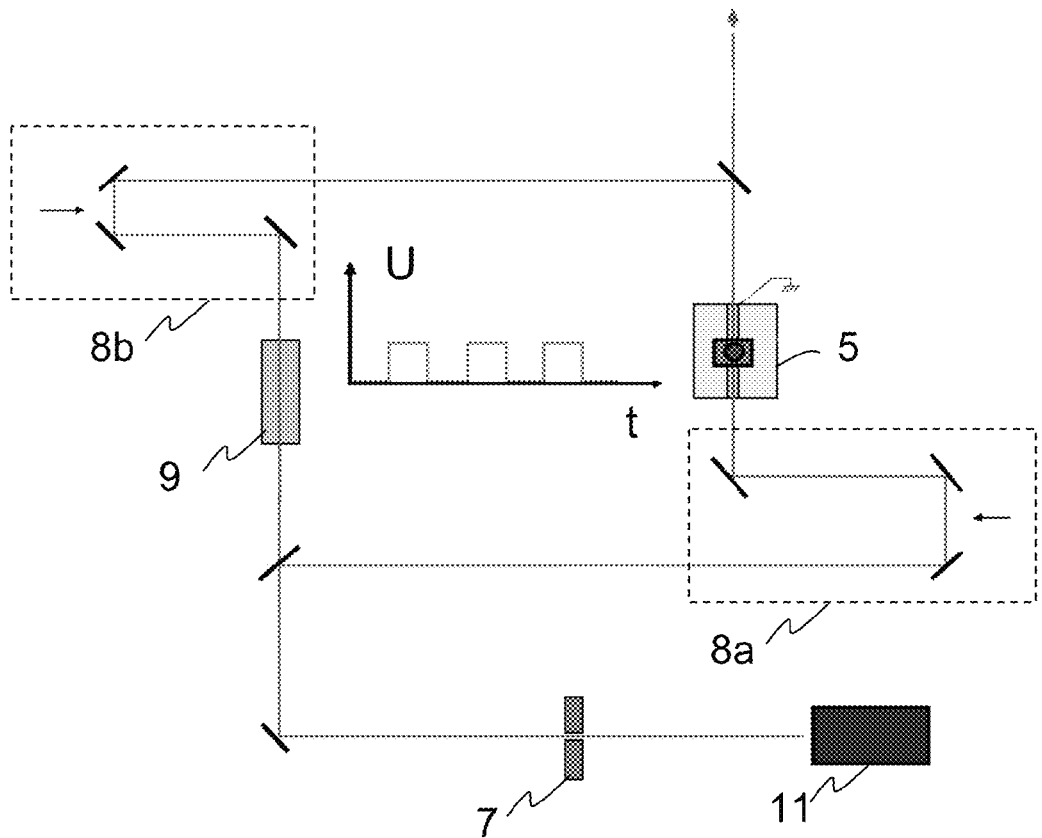

The demonstration is based on spectral interferometry measurements. A wide-frequency-spectrum laser (11), such as for example the commercial model "SuperK™ Compact" marketed by "NKT photonics". This laser operates with a repetition rate of 24 kHz, the emitted radiation spectrum extends from 600 to 900 nm, the duration of the pulses is of the order of the ns and the mean power delivered is of about 100 mW. FIG. 2 shows a laser (11) coupled to an interferometer of the Mach-Zehnder type, used to measure the variation of the spectral phase of the radiation induced by the lithium niobate crystal (5) to which is applied an electric field U(t), schematically shown in graph form in FIG. 2. The electro-optical phase modulator (5) is inserted in one of the arms of the interferometer and the effects of the phase dispersion of the second order are compensated for in the other arm with a dispersive material of suitable length (the 1-order phase being compensated for via an optical delay line 8a or 8b). After recombination, the beam is sent in a spectrometer that allows a direct access to the CEP variation induced by the modulator.

Figure 3:
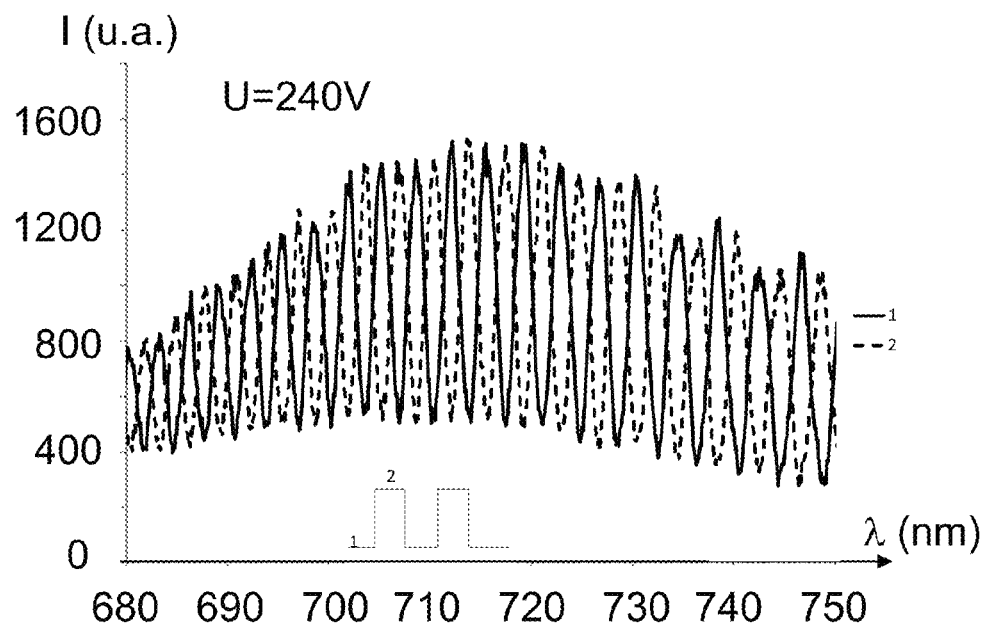
FIG. 3 shows an example of fringes observed by spectral interferometry, in presence of a voltage applied to the $LiNbO_3$ crystal (V=240 Volt) and without voltage.

The voltage applied for a duration of the order of a few hundreds of ms. A membrane (7) controlled from the voltage generator allows selecting the radiation during two time sequences, wherein one of which corresponds to the timing when the voltage is applied (U(t)≠0) and the other to when it is not applied (U(t)=0). In these conditions, it is possible to record in the exit plane of the spectrometer, and by way of comparison, an image of the interference fringes corresponding to the presence of a voltage (doted-line curve in FIG. 3) in superimposition with an image without voltage (full-line curve of FIG. 3), as shown for example in FIG. 3.

Figure 4:
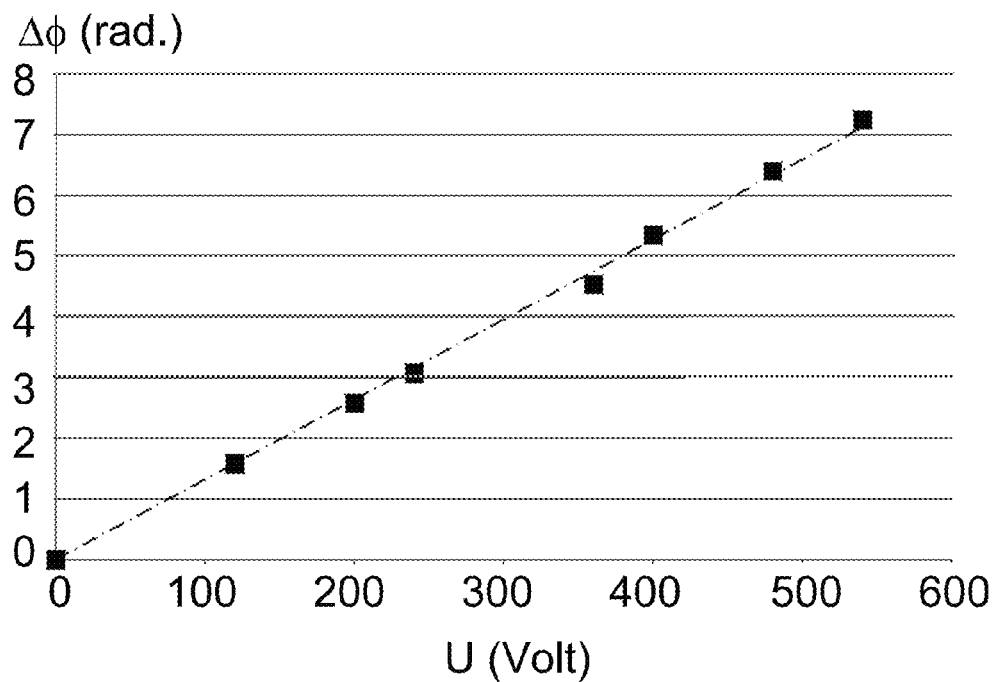
FIG. 4 shows the CEP variation measured by spectral interferometry as a function of the voltage applied to the crystal.

By varying the amplitude of the voltage U applied to the crystal (5) of the transverse-Pockels electro-optical modulator, it may be possible to plot the CEP variation as a function of the electric field. FIG. 4 shows CEP measurements (shown by squares) for different values of electric field applied to the electro-optic modulator as well as a linear regression curve (dash-dot line curve). It may also be determined the coefficient that links the applied voltage to the phase variation that results therefrom.

Second Device

In a second device, the transverse-Pockels electro-optical system (5) is placed on the path of a chirped pulse amplification laser of the Titanium-Sapphire type, the mode-locked oscillator of which is CEP-stabilized. The CEP variation is measured directly as a function of the electric field applied by means of an internally-developed fast f-2f interferometer allowing shot-by-shot measurements at a frequency higher than the kHz.

FIG. 5 schematically shows the laser system according to this second device. It comprises a mode-locked oscillator (1), a stretcher (2), one or several amplification stages (3a, 3b) and a compressor (4). In the example illustrated in FIG. 5, the stretcher (2) and the compressor (4) are based on diffraction gratings (21, 22, 41, 42). The oscillator (1) delivers ultrashort pulses (10) with a repetition rate of the order of 100 MHz, an energy of about 1 nJ and a spectral width of a few tenth of nm. The laser system finally delivers amplified and recompressed pulses (40) of 2 mJ, whose duration is close to 35 fs. The CEP shot-by-shot residual noise after amplification is of about 320 mrad (over a period of one hour). The electro-optical modulator (5) is placed between the stretcher (2) and the regenerative amplifier (3a, 3b).

FIG. 6 shows measurements of the shot-by-shot CEP evolution as a function of time. The different steps correspond to different electric voltages (U=−5 kV; U=−2.5 kV; U=+2.5 kV; U=+5 kV; U=3.5 kV) applied to the electro-optical modulator (5). The dotted line shows the slow CEP drift as a function of time.

This device allows a priori modulating the CEP at a repetition rate higher than the kHz and, to verify this, several voltages have been applied to the crystal as a function of time. FIG. 7 shows the periodic evolution of the CEP observed experimentally via the fringes of the f-2f interferometer, when the voltage applied to the crystal is modulated sinusoidally (FIG. 7A), by a saw-toothed signal (FIG. 7B) or by a square-wave signal (FIG. 7C). These measurements are obtained at the output of a CEP-stabilized chirped pulse amplification TiS chain, using grating-based stretcher and compressor.

FIG. 8 plots the evolution of the CEP imposed by the modulation on the electric field and deduced from fringes observed by the f-2f interferometer. For a better clarity, the phases are offset along the ordinate axis. The full-line curve corresponds to a frequency of the electro-optical modulator of 10 Hz, the dash-line curve to a frequency of 50 Hz, the dash-dot-line curve to a frequency of 100 Hz, and finally the dotted-linecurve to a frequency of 500 Hz. A modulation of the CEP at frequencies going from a few Hertz to several hundreds of Hertz is effectively observed.

Second Embodiment

A second embodiment of the device of the invention is based on the use of a prism compressor and on the modification of the refraction index of the prisms of a compressor by an electro-optical effect for the control of the CEP.

Let's consider for example a prism compressor in a double-path configuration, as schematically shown in FIG. 9A. The compressor (4) comprises a first prism (43), a second prism (44) and a mirror (45). An input pulse (30) is schematically shown by a full line transverse to the axis of the optical beam. A separating line (6) allows separating the incident beam from the output beam of the compressor. In a manner known per se, the first prism (43) spatially scatters the input pulse as a function of the wavelengths present in the pulse spectrum. At the exit of the first prism, three spatially-separated beams ($\lambda_1$, $\lambda_2$ and $\lambda_3$, respectively) have been shown. The second prism (44) also induces a dispersion of the beams. After reflection on the mirror (45) and passing back through the second prism (44) and the first prism (43), the three beams ($\lambda_1$, $\lambda_2$ and $\lambda_3$) are spatially recombined together, but with a time offset, because they have not followed the same optical path. The output pulse (40) may then be time compressed according to the scattering of the input pulses (30).

Electrodes are formed by deposition of a metallic layer (43a, 43b, 44a, 44b) on the opposite faces of the prism (43 and/or 44) (cf. FIG. 9B). The electric field applied between the electrodes is then transverse to the axis of propagation of the pulse beam. It is then possible (via the application of an electric voltage) to modulate by electro-optical effect the refraction index of the prism (43 and/or 44) and then to modulate the dispersion introduced by the compressor (4). By applying the same electric voltage on the two prisms (43 and 44), the system remains fully symmetrical and induces no variation on the pointing of the laser beam. Using four prisms (each of the preceding prisms being then composed of two prisms) and by shifting in the height direction the round trip path of the beam in the compressor, the electric voltage applied on each of the prisms may then be divided by two, for a same phase-shift effect.

The calculations of the variation of the difference between the phase delay and the group delay as a function of the electric field applied show that this method effectively allows the control of the CEP.

The invention proposes several embodiments of simple and relatively cheap devices for fast correction of the CEP, applicable in particular to high-energy chirped pulse amplification lasers. The devices and the method of the invention allow a correction of the CEP of an ultrashort (femtosecond) pulsed laser. Moreover, the invention allows a shot-by-shot correction of the CEP at very high frequencies, going from a few Hz to several MHz. The device may advantageously be used at a frequency going from several tens of kHz to several MHz, to stabilize the CEP drift of a pulsed laser whose repetition rate is comprised in this same frequency range, which is not allowed by the devices based on the insertion of optical components (prismatic plates or other opto-mechanical modifications).

The devices and method of the invention may be used on a CPA laser of the prior art.

The invention claimed is:

1. A high-energy femtosecond pulsed laser, stabilized as regards the phasedrift between envelope frequency and carrier frequency, said laser comprising:
    a source (1) of laser pulses to be amplified, said source (1) being adapted to generate a train of input laser pulses (10) having an envelope frequency (60) and a carrier frequency (50);
    chirped pulse amplification means comprising stretching means (2) adapted to time stretch the input laser pulses (10), optical amplification means (3, 3a, 3b) adapted to amplify the stretched laser pulses (20) and compression means (4) adapted to time compress the amplified laser pulses (30), and
    means for controlling the phase drift between envelope frequency and carrier frequency of the output laser pulses,
    wherein
    said means for controlling the phasedrift between envelope frequency and carrier frequency comprise electro-optical modulation means placed on an optical path of the laser pulses linearly polarized in a Ox direction and wherein said electro-optical modulation means comprise a transverse-Pockels-effect electro-optical phase modulator (5), the electric field being applied in the Ox direction to the electro-optical phase modulator (5), and the amplitude of the voltage U applied to the crystal (5) of the transverse-Pockels electro-optical modulator varying so as to stabilize the phase drift between envelope frequency and carrier frequency of the output laser pulses (40) as a function of time, the Ox direction corresponding to the extraordinary axis of the optical path of the laser pulses.

2. The ultrashort pulsed laser according to claim 1, further comprising means for angularly orienting the ordinary and/or extraordinary optical axes of said Pockels-effect modulator (5) relative to a direction of polarization of the laser pulses.

3. The ultrashort pulsed laser according to claim 1, wherein said Pockels-effect modulator (5) is placed on the optical path of the chirped pulse amplification means.

4. The ultrashort pulsed laser according to claim 1, wherein said stretching means (2) and/or said compression means (4) comprise at least one prism (43, 44) and in that said electro-optical modulation means comprise electrodes (43a, 43b, 44a, 44b) respectively deposited on faces of said prism (43, 44) and means for applying an electric field to the terminals of said electrodes so as to induce a modulation of the refraction index of said prism (43, 44).

5. The ultrashort pulsed laser according to claim 4, wherein said stretching means and/or said compression means respectively comprise two prisms (43, 44) arranged so as to compensate for a spatial offset of the optical beam and in that said electro-optical modulation means comprise (43a, 43b, 44a, 44b) respectively deposited on faces of said two prisms (43, 44) and means for applying an electric field to the terminals of the electrodes of the two prisms (43, 44) so as to modulate the refraction index of the two prisms (43, 44).

6. The ultrashort pulsed laser according to claim 1, wherein said electro-optical modulation means have an operating frequency comprised between a few Hz and several MHz.

7. The ultrashort pulsed laser according to claim 1, further comprising:
    means for measuring the phase-drift between envelope frequency (60) and carrier frequency (50) of the output laser pulses as a function of time;
    a feedback loop so as to adjust the modulation induced by said electro-optical means as a function of the measurement of the phase drift between envelope frequency and carrier frequency.

8. The ultrashort pulsed laser according to claim 2, wherein said Pockels-effect modulator (5) is placed on the optical path of the chirped pulse amplification means.

9. The ultrashort pulsed laser according to claim 2, wherein said electro-optical modulation means have an operating frequency comprised between a few Hz and several MHz.

10. The ultrashort pulsed laser according to claim 3, wherein said electro-optical modulation means have an operating frequency comprised between a few Hz and several MHz.

11. The ultrashort pulsed laser according to claim 4, wherein said electro-optical modulation means have an operating frequency comprised between a few Hz and several MHz.

12. The ultrashort pulsed laser according to claim 5, wherein said electro-optical modulation means have an operating frequency comprised between a few Hz and several MHz.

13. The ultrashort pulsed laser according to claim 2, further comprising:
    means for measuring the phase-drift between envelope frequency (60) and carrier frequency (50) of the output laser pulses as a function of time;
    a feedback loop so as to adjust the modulation induced by said electro-optical means as a function of the measurement of the phase drift between envelope frequency and carrier frequency.

14. The ultrashort pulsed laser according to claim 3, further comprising:
    means for measuring the phase-drift between envelope frequency (60) and carrier frequency (50) of the output laser pulses as a function of time;
    a feedback loop so as to adjust the modulation induced by said electro-optical means as a function of the measurement of the phase drift between envelope frequency and carrier frequency.

15. A method of stabilization of the phase drift between envelope frequency (60) and carrier frequency (50) of a high-energy femtosecond pulsed laser, said method comprising the following steps:
    generation of a train of input laser pulses (10) formed of an envelope frequency (60) and a carrier frequency (50);
    chirped pulse amplification of said input laser pulses (10) comprising a step of time stretching of said input laser pulses, a step of optical amplification of said stretched laser pulses (20) and a step of time compression of said stretched and amplified laser pulses (30), and
    said step of chirped pulse amplification comprising a step of stabilization of the phase drift between envelope frequency (60) and carrier frequency (50) of the output laser pluses (40),
    wherein:
    said step of stabilization of the phase drift between envelope frequency and carrier frequency comprises an electro-optical modulation of an optical component so as to stabilize the phase drift between envelope frequency and carrier frequency of the output laser pulses as a function of time.

16. The method of stabilization according to claim 15, wherein said method further comprises:
- a step of measurement of the phase drift between envelope frequency and carrier frequency of the output laser pulses as a function of time, and
- a step of adjustment of the feedback electro-optical phase modulation as a function of said measurement of the phase drift between envelope frequency and carrier frequency.

* * * * *